United States Patent
Shankaraiah et al.

(10) Patent No.: US 8,670,505 B2
(45) Date of Patent: Mar. 11, 2014

(54) EARLY DETECTION OF SEGMENT TYPE USING BPSK AND DBPSK MODULATED CARRIERS IN ISDB-T RECEIVERS

(76) Inventors: Subrahmanya Kondageri Shankaraiah, Bagalore (IN); Abhijeet B Magadum, Hukkeri (IN)

( * ) Notice: Subject to any disclaimer, the term of this patent is extended or adjusted under 35 U.S.C. 154(b) by 0 days.

(21) Appl. No.: 13/436,162

(22) Filed: Mar. 30, 2012

(65) Prior Publication Data
US 2012/0250800 A1 Oct. 4, 2012

(30) Foreign Application Priority Data
Mar. 31, 2011 (IN) .......................... 1096/CHE/2011

(51) Int. Cl.
*H03D 3/22* (2006.01)
(52) U.S. Cl.
USPC ........ 375/329; 329/304; 332/103; 340/12.11; 375/269; 375/308; 375/322
(58) Field of Classification Search
None
See application file for complete search history.

(56) References Cited

U.S. PATENT DOCUMENTS

| | | | | |
|---|---|---|---|---|
| 2007/0229340 | A1* | 10/2007 | Krishnamoorthi et al. | ... 341/155 |
| 2011/0261905 | A1* | 10/2011 | Shental et al. | ................ 375/316 |
| 2012/0011548 | A1* | 1/2012 | Lahtonen et al. | ............... 725/62 |

* cited by examiner

*Primary Examiner* — Adolf Dsouza
(74) *Attorney, Agent, or Firm* — The Law Office of Austin Bonderer, PC; Austin Bonderer (57) ABSTRACT

A receiver system for early detection of a segment type of an input signal based on BPSK and DBPSK modulated carriers is provided. The receiver system includes a tuner that converts the input signal into an intermediate frequency (IF) signal, a signal conditioning module that converts the IF signal into a baseband signal, a Frequency Domain Synchronization (FDS) block that detects the segment type of the input signal based on a carrier powers, a Transmission and Multiplexing Configuration Control (TMCC) decode block that performs a decoding operation on the received signal, a channel estimation block that estimates a channel and obtains a channel information. The TMCC decode block uses the channel information obtained from channel estimation block to correct a fast-frequency selective fading on the received signal before the decoding operation.

14 Claims, 6 Drawing Sheets

| SEGMENT NO | 11 | 9 | 7 | 5 | 3 | 1 | 0 | 2 | 4 | 6 | 8 | 10 | 12 |
|---|---|---|---|---|---|---|---|---|---|---|---|---|---|
| CP | 0 | 0 | 0 | 0 | 0 | 0 | 0 | 0 | 0 | 0 | 0 | 0 | 0 |
| AC1_1 | 10 | 53 | 61 | 11 | 20 | 74 | 35 | 76 | 4 | 40 | 8 | 7 | 98 |
| AC1_2 | 28 | 83 | 100 | 101 | 40 | 100 | 79 | 97 | 89 | 89 | 64 | 89 | 101 |
| AC2_1 | 3 | 3 | 29 | 28 | 23 | 30 | 3 | 5 | 13 | 72 | 36 | 25 | 10 |
| AC2_2 | 45 | 15 | 41 | 45 | 63 | 81 | 72 | 18 | 93 | 95 | 48 | 30 | 30 |
| AC2_3 | 59 | 40 | 84 | 81 | 85 | 92 | 85 | 57 | 98 | 100 | 52 | 42 | 55 |
| AC2_3 | 77 | 58 | 93 | 91 | 105 | 103 | 89 | 92 | 102 | 105 | 74 | 104 | 81 |
| TMCC 1 | 13 | 25 | 4 | 36 | 10 | 7 | 49 | 31 | 16 | 5 | 78 | 34 | 23 |
| TMCC 2 | 50 | 63 | 7 | 48 | 28 | 25 | 61 | 39 | 30 | 10 | 82 | 48 | 37 |
| TMCC 3 | 70 | 73 | 17 | 55 | 44 | 47 | 96 | 47 | 37 | 21 | 85 | 54 | 51 |
| TMCC 4 | 83 | 80 | 51 | 59 | 47 | 60 | 99 | 65 | 74 | 44 | 98 | 70 | 68 |
| TMCC 5 | 87 | 93 | 71 | 86 | 54 | 87 | 104 | 72 | 83 | 61 | 102 | 101 | 105 |

FIG. 3A

| SEGMENT NO | 11 | 9 | 7 | 5 | 3 | 1 | 0 | 2 | 4 | 6 | 8 | 10 | 12 |
|---|---|---|---|---|---|---|---|---|---|---|---|---|---|
| AC1_1 | 10 | 53 | 61 | 11 | 20 | 35 | 76 | 4 | 40 | 8 | 7 | 98 | |
| AC1_2 | 28 | 83 | 100 | 101 | 40 | 79 | 97 | 89 | 89 | 64 | 89 | 101 | |
| TMCC 1 | 70 | 25 | 17 | 86 | 44 | 47 | 31 | 83 | 61 | 85 | 101 | 23 | |

| SCATTERED PILOT POSITION IN SEGMENT NUMBER 1 | | | | | | | | | |
|---|---|---|---|---|---|---|---|---|---|
| SP | 0 | 12 | 24 | 36 | 48 | 60 | 72 | 84 | 96 |

EARLY DETECTION OF SEGMENT TYPE USING BPSK AND DBPSK MODULATED CARRIERS IN ISDB-T RECEIVERS

BACKGROUND

1. Technical Field

The embodiments herein generally relates to a detection of segment type in a receiver system, and, more particularly, to an early detection of segment type using Binary Phase Shifting Key (BPSK) and Differential Phase Shifting Key (DBPSK) modulated carriers in ISDB-T receivers.

2. Description of the Related Art

Orthogonal Frequency Division Multiplexing (OFDM) is a technique for modulating digital data, which uses a large number of closely-spaced orthogonal sub-carriers. In the OFDM technique, digital data is modulated to the amplitude and the phase of each of the orthogonal sub-carriers within a transmission band. This technique has been widely used in terrestrial digital broadcasting receiver designs such as Integrated Services Digital Broadcasting-Terrestrial (ISDB-T) and Integrated Services Digital Broadcasting-Terrestrial Digital Sound Broadcasting (ISDB-TSB) for OFDM systems, which is assumed as an effective digital modulation scheme for transmitting data at high rate in many wireless applications, where the radio signals are split into multiple smaller sub-signals that are then transmitted simultaneously at different frequencies to the receiver.

A Transport Stream Packet (TSP) in the ISDB-T multiplexing frame is typically a transport stream packet from layers. The order of these TSPs is unique for a given transmission parameter configuration (e.g., transmission mode, guard interval, modulation and coding rate). In an ISDB-T or ISDB-TSB OFDM symbol, there are data carriers, pilot carriers, transmission and multiplexing configuration control (TMCC) carriers, and auxiliary channel (AC) carriers. The ISDB-T standard specifies two kinds of segment types such as Coherent modulated (CM) segments and Differential Modulated (DM) segments. The information about segment type is specified in DBPSK modulated TMCC carrier.

Figure 1:
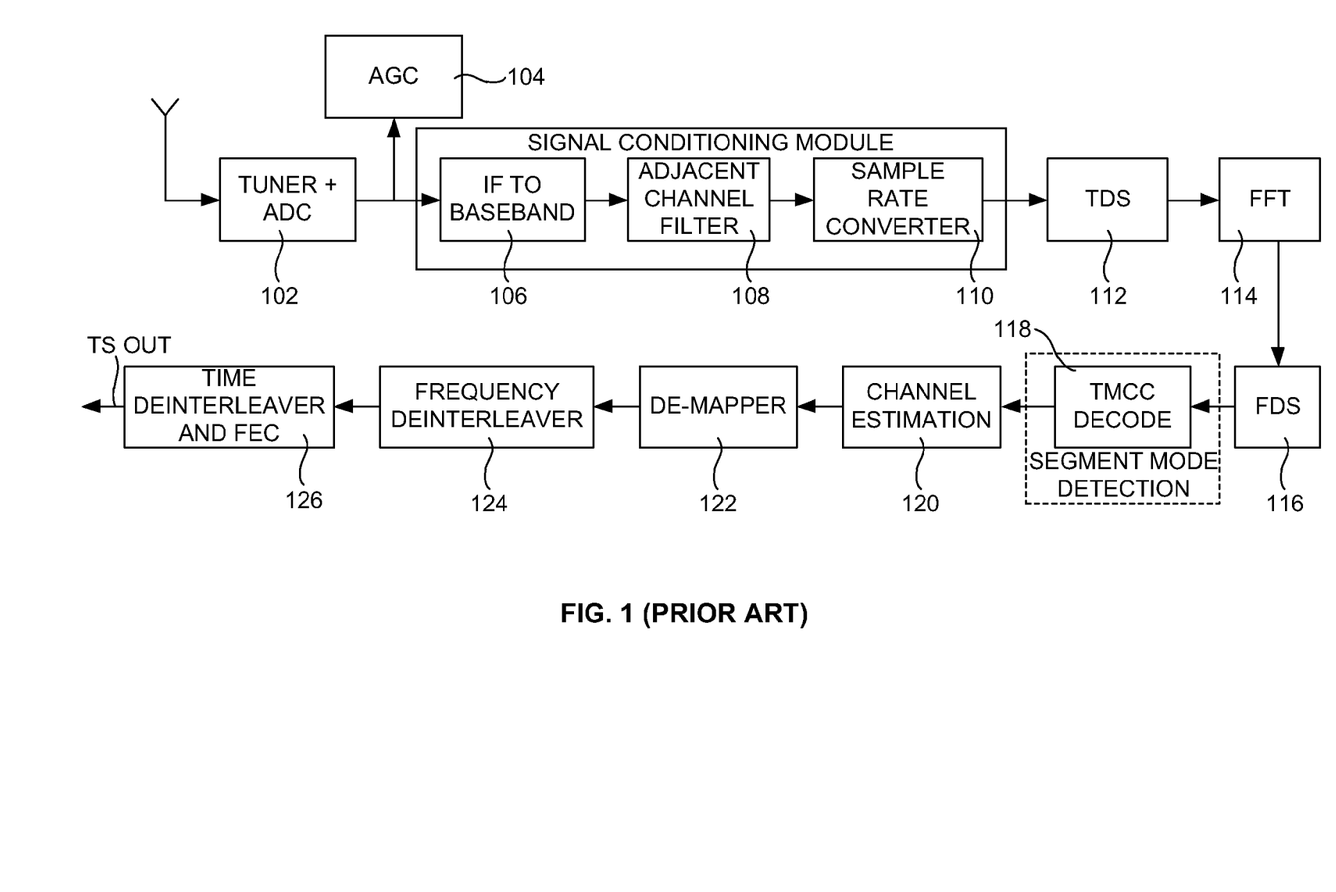
FIG. 1 illustrates a block diagram of a typical ISDB-T receiver.

FIG. 1 illustrates a block diagram of a typical ISDB-T receiver 100 that includes (i) a tuner and an Analog to Digital Converter (ADC) block 102, (ii) an Automatic Gain Control (AGC) block 104, (iii) an IF to baseband conversion block 106, (iv) an adjacent channel filter block 108, (v) a sample rate converter block 110, (vi) a Time Domain Synchronisation (TDS) block 112, (vii) a Fast Fourier Transformation (FFT) block 114, (viii) a Frequency Domain Synchronisation (FDS) block 116, (ix) a Transmission and Multiplexing Configuration Control (TMCC) decode block 118, (x) a channel estimation unit 120, (xi) a de-mapper 122, (xii) a frequency deinterleaver 124, and (xiii) a time deinterleaver and Forward Error Correction (FEC) 126. The tuner and ADC block 102 receives an input signal from an antenna. The AGC block 104 controls a gain of the tuner in order to deliver relatively constant amplitude to the ADC block 102. The IF to baseband block 106 converts the input signal (e.g., IF signal) to a baseband signal.

The adjacent channel filter block 108 rejects the adjacent channels from the baseband signal. The sample rate converter block 110 re-samples the baseband signal. The sampling of the baseband signal is different from a baseband symbol rate. The IF to baseband conversion block 106, the adjacent channel filter block 108, and the sample rate converter block 110 constitute to a signal conditioning module. The TDS block 112 detects a mode, and a Guard Interval (GI) of a received signal at the TDS block. The FFT block 114 performs a Fast Fourier transformation of the baseband data and the size of the FFT will be equal to the detected mode. The FDS block 116 locates pilots in the frequency domain, and performs frequency domain synchronization on the pilots. The TMCC decode block 118 performs a TMCC decoding operation to detect a segment type for all the segments. In order to detect Segment type TMCC carrier decoding needs to be done which takes approximately 408 symbols and inherently more channel changeover time when there is a switch across different channels. Accordingly, there remains a need for to reduce the channel changeover time when there is a switch across different channels.

SUMMARY

In view of the foregoing, an embodiment herein provides a receiver system for early detection of a segment type of an input signal based on BPSK and DBPSK modulated carriers. The receiver system includes (i) an antenna for receiving the input signal, (ii) a tuner that converts the input signal into an intermediate frequency (IF) signal, (iii) a signal conditioning module that converts the IF signal into a baseband signal, (iv) a Frequency Domain Synchronisation (FDS) block that detects the segment type of the input signal, (v) a Transmission and Multiplexing Configuration Control (TMCC) decode block that performs a decoding operation on a signal received from the FDS block, (vi) a channel estimation block that estimates a channel after the FDS block detects the segment type and before the TMCC decode block performs the decoding operation. In one embodiment the receiver system is an ISDB-T receiver system and the segment type is a Coherent Modulated (CM) or a Differential Modulated (DM).

In one aspect, a receiver system for early detection of segment type of an input signal based on BPSK and DBPSK modulated carrier and minimizing a channel changeover time is provided. The receiver system includes (i) a Frequency Domain Synchronisation (FDS) block that calculates a power of carriers of the input signal and detects the segment type, (ii) a TMCC decode block that performs decoding operation on a received signal from the FDS block and (iii) a channel estimation block that estimates a channel and obtains channel information. The TMCCC decode block uses the channel information to correct a fast-frequency selective fading on the received signal before the TMCC decoding operation. The carrier powers are calculated using pilot carriers, a Transmission and Multiplexing Configuration Control (TMCC) carriers, and an Auxiliary Channel (AC) carriers of the input signal.

In yet another aspect, a method of detecting the segment type for a received symbol in a receiver system is provided. The method includes (i) calculating a first power using scattered pilots and a second power using TMCC and Auxiliary Channel (AC) carriers of the received symbol, (ii) averaging the first power and the second power across a multiple symbols, and (iii) determining the segment type based on the first power and the second power. The method further includes (i) incrementing a symbol count on the first power and the second power being calculated, (ii) determining whether the symbol count is greater than a specified iteration count, (iii) determining that the segment type is coherent modulated (CM) when the first power is greater than the second power and when said symbol count is greater than said specified iteration count, and (iii) calculating the first power and said second power again when the symbol count is not greater than the specified iteration count.

The method further includes (i) determining that the segment type is Differential Modulated (DM) when said first power is lesser than or equal to the second power and when said symbol count is greater than the specified iteration count. The first power is calculated using a Scattered Pilots and is given in accordance with an equation $$P = 1/k \sum_{j=0}^{k-1} (x_j)^2,$$

P=sum of carrier power present at position of the Scattered Pilots, k=Number of the scattered pilots, and $x_j$=carrier of $j^{th}$ Scattered Pilot position. The second power is calculated using a TMCC and a AC pilots and is given in accordance with an equation $$P = 1/k \sum_{j=0}^{k-1} (x_j)^2,$$

P=sum of carriers power present at positions of the TMCC and the AC pilots, k=Number of the TMCC and said AC pilots, $x_j$=carrier at $j^{th}$ position. The iteration count is programmable.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Figure 2:
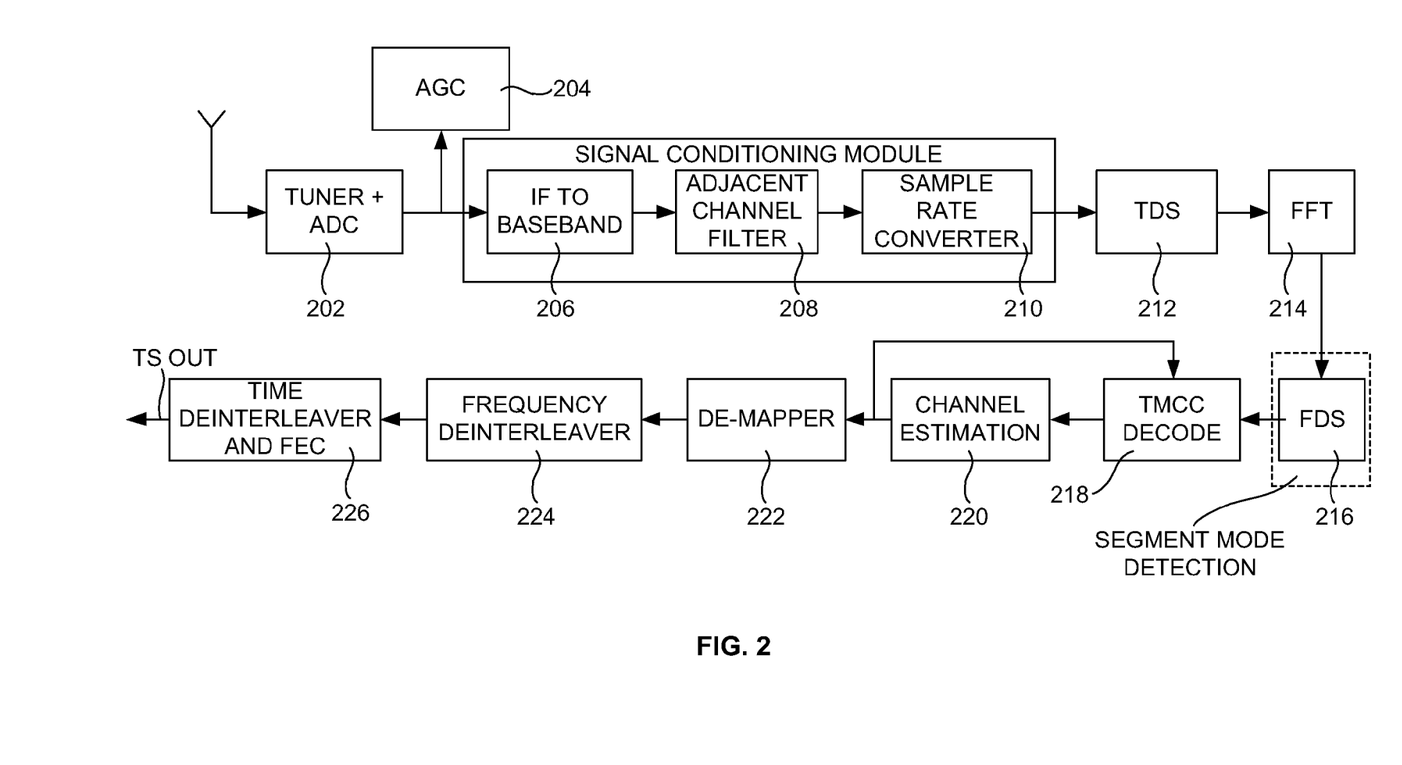
FIG. 2 illustrates a block diagram of an improved ISDB-T receiver according to an embodiment herein.
Figure 3A:
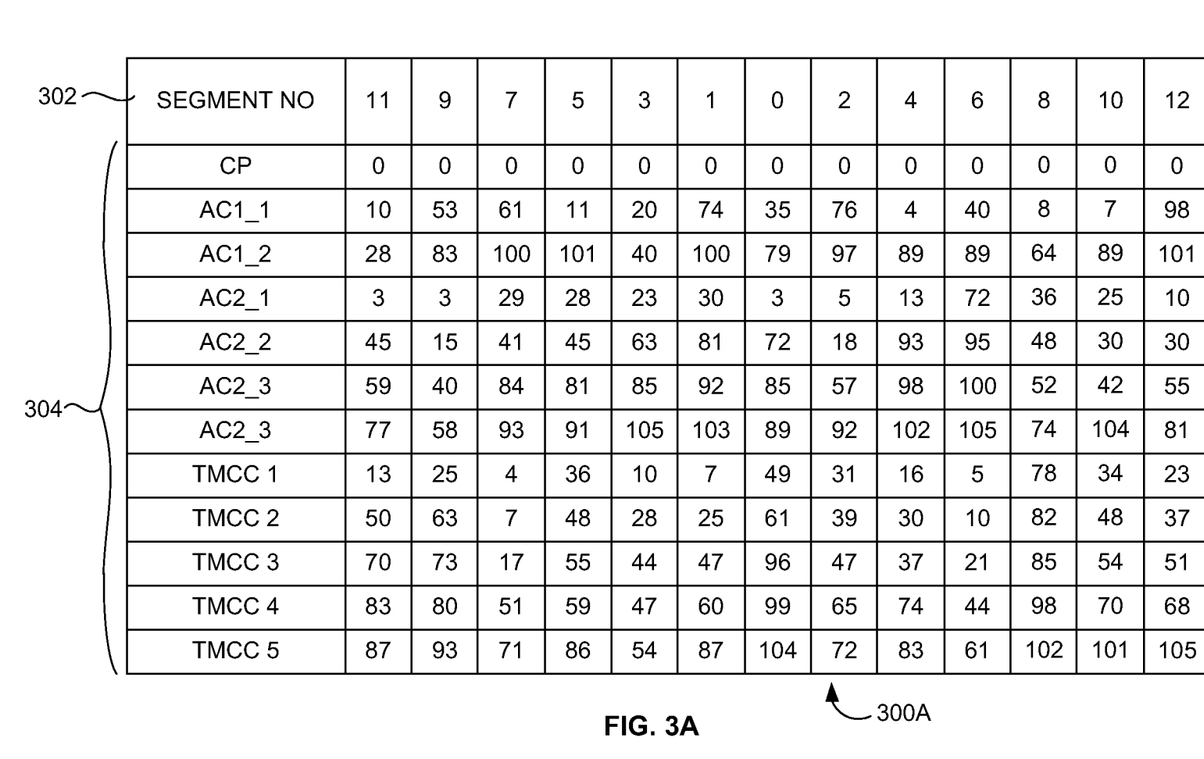
FIG. 3A through FIG. 3C illustrate a table views of arrangement of one or more carriers according an embodiment herein.
Figure 3B:
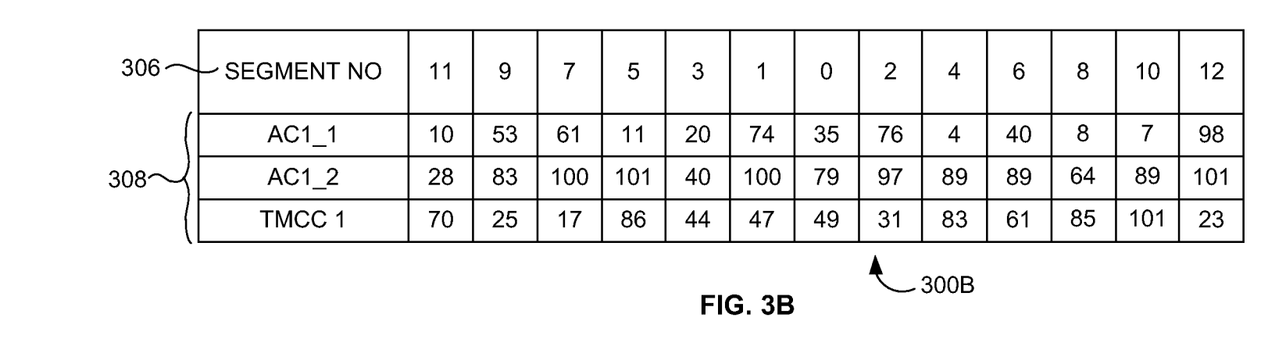
Figure 3C:
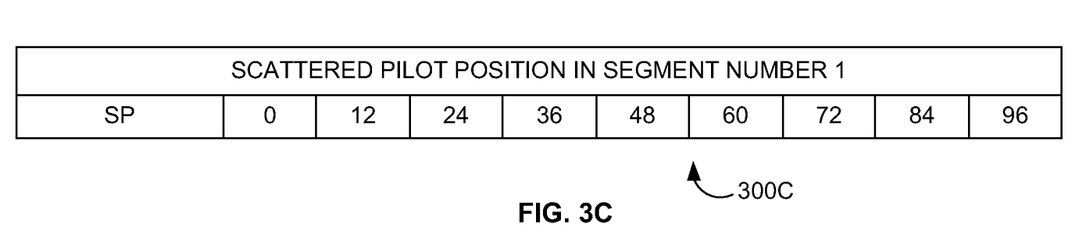
Figure 4:
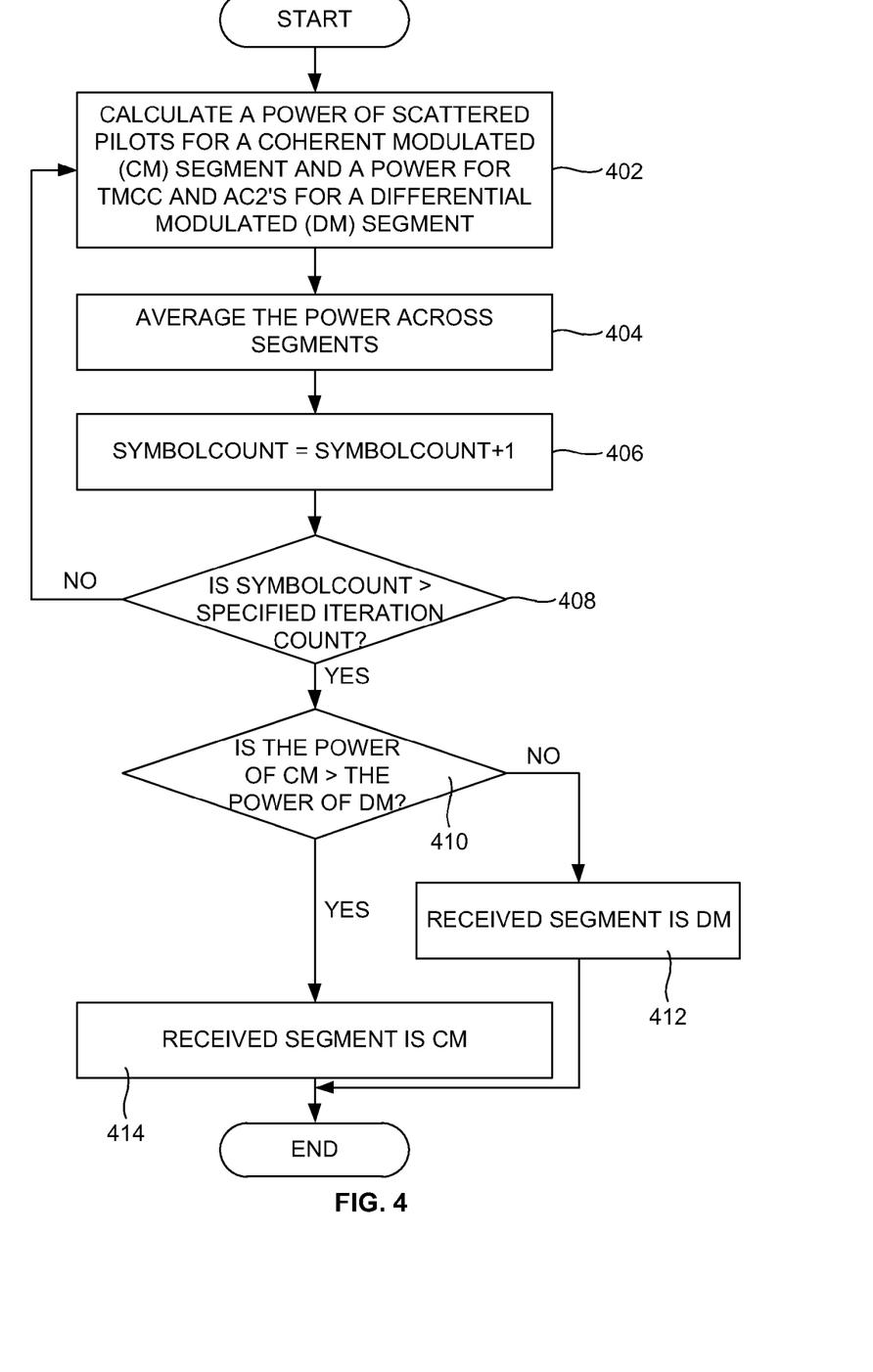
FIG. 4 is a flow chart illustrating a method of detecting a segment type in the FDS block of the ISDB-T receiver of FIG. 2 according to an embodiment herein.

As mentioned, there remains a need for an optimized receiver that minimizes the channel changeover time when there is a switch across different channels. The embodiments herein achieve this by an early detection of segment type, and channel estimation that can be started much prior to TMCC decode after detecting segment type. In an ISDB-T or ISDB-TSB OFDM symbol, there are data carriers, pilot carriers, Transmission and Multiplexing Configuration Control (TMCC) carriers, and Auxiliary Channel (AC) carriers. The embodiment herein achieves this by using power of these carriers to detect segment type, without performing TMCC carrier decoding. Referring now to the drawings, and more particularly to FIG. 2 through FIG. 4, where similar reference characters denote corresponding features consistently throughout the figures, these are shown preferred embodiments.

FIG. 2 illustrates a block diagram of an improved ISDB-T receiver 200 having a tuner and an ADC block 202, a AGC block 204, an IF to baseband conversion block 206, an adjacent channel filter block 208, a sample rate converter block 210, a Time Domain Synchronisation (TDS) block 212, a Fast Fourier Transformation (FFT) block 214, a Frequency Domain Synchronisation (FDS) 216, a TMCC decode block 218, a channel estimation unit 220, a de-mapper 222, a frequency deinterleaver 224, and a time deinterleaver and FEC 226. The tuner and ADC block 202 receives an input signal from an antenna. The AGC block 204 controls a gain of the tuner in order to deliver constant amplitude to the tuner and the ADC block 202. The IF to baseband conversion block 206 converts the input signal (e.g., an IF signal) to a baseband signal.

The adjacent channel filter block 208 rejects the adjacent channels from the baseband signal. The sample rate converter block 210 samples the baseband signal. The sampling of the baseband signal is different from a baseband rate. The IF to baseband conversion block 206, the adjacent channel filter block 208, and the sample rate converter block 210 constitute to a signal conditioning module. The TDS block 212 detects a mode (2K mode), and a Guard Interval (GI) of the signal.

The FFT block 214 performs a Fast Fourier Transformation of the baseband signal and the size of the FFT is equal to the detected mode. The FDS block 216 locates one or more pilots in the frequency domain, and performs a frequency domain synchronization such that the carriers are in an appropriate position. The FDS block 216 also detect a segment type for all the segments. The transmission bandwidth is divided into 13 equal segments. Each of the segments is either a Differential Modulated (DM) segment type or a Coherent Modulated (CM) segment type. A carrier power present at positions of the TMCC and AC2 carriers is calculated when the segment type is the Differential Modulation (DM). Similarly, a carrier power present at positions of the scattered pilot carriers is calculated when the segment type is the Coherent Modulation (CM). The calculated powers across the symbols are averaged such that segment type detection is robust.

The FDS block 216 increments a symbol count by one after power calculation is performed for received symbol. It is further determined whether the symbol count is greater than a specified iteration count. In one embodiment, the iteration count is predefined and is programmable. If symbol count is greater than specified iteration count, then the power level of both segment types are checked. If the power for Differential Modulation is greater than the power for Coherent Modulation, then the received segment type is Differential Modulated. Else the received segment type is Coherent Modulated. In one embodiment, depending upon power levels, the segment type is detected. The same technique may be used to detect the segment type for remaining 12 segments and for a 4K mode, and an 8K mode.

The TMCC decode block 218 performs a TMCC decoding operation. The channel estimation unit 220 estimates a channel based on the segment type detected for all the segments. The channel estimation may also be performed after the detection of segment type and before the TMCC decoding. The TMCC decode becomes more robust by using estimated channel information. The TMCC decode block 218 corrects the fast-frequency selective fading on the received signal based on the estimated channel information before performing the decoding operation. The De-Mapper block 222 performs a correction on the channel carriers. In one embodiment, a soft decision is made for the received symbols based on a channel impulse response, and an equalizer data. The frequency deinterleaver block 224 reverses the frequency interleaving performed at a transmitter. The time-deinterleaver and FEC block 226 obtains delay buffer sizes for various carriers (e.g., all the data carriers) and interleaving lengths for a given OFDM signal from the TMCC decode block 218 and reverses the time interleaving operations performed at the transmitter.

FIG. 3A through FIG. 3C illustrate a table views 300A, 300B, and 300C of arrangement of one or more carriers according an embodiment herein. FIG. 3A is a table view having a segment number field 302, and a carriers field 304 that illustrates the arrangement of a Continual Pilot (CP) carrier, an Auxiliary Channel (AC) carriers, and a Transmission and Multiplexing Configuration Control (TMCC) carriers for Differential Modulation (DM) in 2K mode. FIG. 3B is a table view a segment number field 306, and a carriers field 308 that illustrates the arrangement of a AC carriers, and a TMCC carriers for Coherent Modulation (CM) in 2K mode.

FIG. 3C illustrates a table view of the arrangement of a Scattered Pilot (SP) carriers for Coherent Modulation (CM) in 2K mode. Coherent modulated segment includes nine SP carriers, one TMCC carrier, and two AC1 carriers. Differential Modulated segment includes one CP carrier, five TMCC carriers, two AC1 carriers, and four AC2 carriers.

In one embodiment, the SP carriers and the CP carriers are BPSK modulated. In another embodiment, the TMCC carrier, AC1 carriers, and the AC2 carriers are DBPSK modulated. All the above carriers take modulation amplitude of either +4/3 or −4/3. Apart from AC1 carriers, other carriers are present either in Differential Modulation or in Coherent Modulation. The arrangement of the above carriers may vary depending upon the segment modulation type.

FIG. 4 is a flow chart illustrating a method of detecting a segment type in the FDS block 216 of the ISDB-T receiver 200 of FIG. 2 according to an embodiment herein. In step 402, a power of scattered pilots for a Coherent Modulated (CM) segment and a power for TMCC and AC's for a Differential Modulated (DM) segment are calculated in $$P = 1/k \sum_{j=0}^{k-1} (x_j)^2$$

where P=sum of carrier power present at position of scattered pilots power for one CM segment, k=number of scattered pilots in one CM segment, and $x_j$=carrier of $j^{th}$ scattered pilot position in a segment, and $$P = 1/k \sum_{j=0}^{k-1} (x_j)^2$$

where P=sum of carriers power present at positions of TMCC and AC2 carriers, k=number of TMCC and AC2 carriers in one DM segment, $x_j$=carrier at $j^{th}$ position in a segment In step 404, the powers calculated in step 402 are averaged across the OFDM symbols such that the segment type detection is robust. In step 406, symbol count is incremented by one after power calculation is performed for received segment. In step 408, it is checked whether the symbol count is greater than the specified iteration count. If yes, then it is checked whether the power of the CM is greater than the power of the DM segment in step 408. Else, (If No), the step 402 to step 408 is repeated. If the power of the CM is not greater than the DM segment is received in step 412. Else, (If No), then the CM segment is received in step 414.

Figure 5:
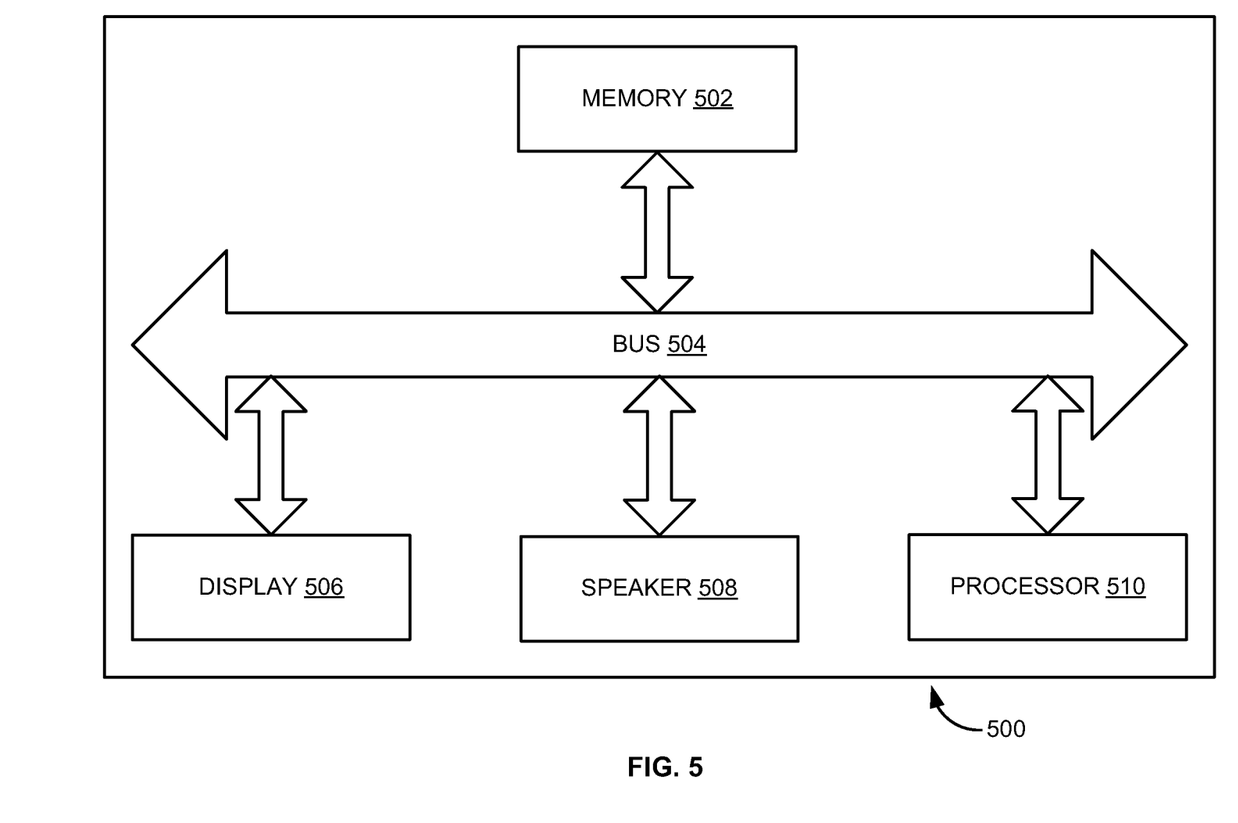
FIG. 5 illustrates an exploded view of a receiver according to an embodiment herein.

FIG. 5 illustrates exploded view of a receiver 500 having an a memory 502 having a computer set of instructions, a bus 504, a display 506, a speaker 508, and a processor 510 capable of processing a set of instructions to perform any one or more of the methodologies herein, according to an embodiment herein. The processor 510 may also enable digital content to be consumed in the form of video for output via one or more displays 506 or audio for output via speaker and/or earphones 508. The processor 510 may also carry out the methods described herein and in accordance with the embodiments herein. Digital content may also be stored in the memory 502 for future processing or consumption. The memory 502 may also store program specific information and/or service information (PSI/SI), including information about digital content (e.g., the detected information bits) available in the future or stored from the past.

A user of the receiver 500 may view this stored information on display 506 and select an item of for viewing, listening, or other uses via input, which may take the form of keypad, scroll, or other input device(s) or combinations thereof. When digital content is selected, the processor 510 may pass information. The content and PSI/SI may be passed among functions within the receiver 500 using bus 504.

The embodiments herein discussed about early detection of segment type prior to TMCC decoding operation in the receiver system. Channel estimation unit 220 can be started much prior to TMCC decode after detecting the segment type and thus reduce a channel changeover time when there is switch across different channels. TMCC decode block 218 uses the channel information to correct a fast-frequency selective fading on the received signal before decoding operation which will increase the performance of decoding operation.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed

What is claimed is:

1. A method of early detection of a segment type for received symbols in a receiver system for reducing a channel changeover time in said receiver system, said method comprising:
    calculating a first power and a second power of carriers of said received symbols; and
    determining said segment type based on said first power and said second power, wherein said segment type is a Coherent Modulated (CM) or a Differential Modulated (DM);
    determining that said segment type is Differential Modulated (DM) when said first power is less than or equal to said second power and when a symbol count is greater than a specified iteration count.

2. The method of claim 1, further comprising:
    incrementing said symbol count when said first power and said second power are calculated;
    determining whether said symbol count is greater than said specified iteration count;
    determining that said segment type is Coherent Modulated (CM) when said first power is greater than said second power and when said symbol count is greater than said specified iteration count;
    calculating said first power and said second power of carriers of said received symbols when said symbol count is not greater than said specified iteration count;
    incrementing said symbol count when said first power and said second power are calculated; and
    determining said segment type based on said first power and said second power.

3. The method of claim 1, wherein said first power is calculated using a Scattered Pilots in accordance with an equation:

$$P = 1/k \sum_{j=0}^{k-1} (x_j)^2,$$

wherein said P=sum of said first power present at a positions of said Scattered Pilots, said k=Number of said scattered pilots, and xj=carrier of jth Scattered Pilot position.

4. The method of claim 1, wherein said second power is calculated using a TMCC and a AC pilots in accordance with an equation $$P = 1/k \sum_{j=0}^{k-1} (x_j)^2,$$

wherein said P=sum of said second power present at a positions of said TMCC and said AC pilots, and said k=Number of said TMCC and said AC pilots, $x_j$=carrier at $j^{th}$ position.

5. The method of claim 2, wherein said specified iteration count is programmable.

6. A method of early detection of a segment type for received symbols in a receiver system for reducing a channel changeover time in said receiver system, said method comprising:
    calculating a first power and a second power of carriers of said received symbols;
    determining said segment type based on said first power and said second power, wherein said segment type is a Coherent Modulated (CM) or a Differential Modulated (DM);
    incrementing a symbol count when said first power and said second power are calculated;
    determining whether said symbol count is greater than a specified iteration count;
    determining that said segment type is Coherent Modulated (CM) when said first power is greater than said second power and when said symbol count is greater than said specified iteration count;
    calculating said first power and said second power of carriers of said received symbols when said symbol count is not greater than said specified iteration count;
    incrementing said symbol count when said first power and said second power are calculated; and
    determining said segment type based on said first power and said second power.

7. The method of claim 6, further comprising determining that said segment type is Differential Modulated (DM) when said first power is less than or equal to said second power and when a symbol count is greater than said specified iteration count.

8. The method of claim 6, wherein said first power is calculated using a Scattered Pilots in accordance with an equation:

$$P = 1/k \sum_{j=0}^{k-1} (x_j)^2,$$

wherein said P=sum of said first power present at a positions of said Scattered Pilots, said k=Number of said scattered pilots, and xj=carrier of jth Scattered Pilot position.

9. The method of claim 6, wherein said second power is calculated using a TMCC and a AC pilots in accordance with an equation $$P = 1/k \sum_{j=0}^{k-1} (x_j)^2,$$

wherein said P=sum of said second power present at a positions of said TMCC and said AC pilots, and said k=Number of said TMCC and said AC pilots, $x_j$=carrier at $j^{th}$ position.

10. The method of claim 6, wherein said specified iteration count is programmable.

11. The method of claim 6, wherein said first power and said second power are calculated using a Frequency Domain Synchronisation (FDS) block.

12. The method of claim 11, wherein said segment type is determined using said Frequency Domain Synchronisation (FDS) block, wherein a signal received from said FDS block comprises a segment type information.

13. The method of claim 12, further comprising performing a decoding operation on said signal received from said FDS block using a Transmission and Multiplexing Configuration Control (TMCC) decode block.

14. The method of claim 13, further comprising estimating a channel after said FDS block detects said segment type and before said TMCC decode block performs said decoding operation using a channel estimation block.

* * * * *